United States Patent [19]

Manning

[11] Patent Number: 4,560,858
[45] Date of Patent: Dec. 24, 1985

[54] LONG WEARING CONTACT TIP FOR INERT GAS ARC WELDING

[75] Inventor: Phillip R. Manning, Hampton, Va.

[73] Assignee: Ashton Wray, Jr., Hampton, Va. ; a part interest

[21] Appl. No.: 644,999

[22] Filed: Aug. 28, 1984

[51] Int. Cl.⁴ .............................................. B23K 9/12
[52] U.S. Cl. ........................ 219/137.52; 219/137.44; 219/137.62
[58] Field of Search ............... 219/137.52, 137.61, 219/137.62, 137.31, 137.44, 136, 74

[56] References Cited

U.S. PATENT DOCUMENTS

| | | | |
|---|---|---|---|
| 2,536,294 | 1/1951 | Landis et al. | 314/38 |
| 2,761,049 | 8/1956 | McElrath et al. | 219/137.52 |
| 3,112,392 | 11/1963 | Orr et al. | 219/137.42 |
| 3,211,944 | 10/1965 | Fein | 314/68 |
| 3,230,343 | 1/1966 | Nagy | 219/137.61 |
| 3,249,734 | 5/1966 | Meyer | 219/137.61 |
| 3,283,121 | 11/1966 | Bernard et al. | 219/137.44 |
| 3,502,841 | 3/1970 | Heer | 219/137.61 |
| 3,514,570 | 5/1970 | Bernard et al. | 219/137.61 |
| 3,544,758 | 12/1970 | dal Molin | 219/137.52 X |
| 3,676,640 | 7/1972 | Bernard et al. | 219/137.52 |
| 3,731,048 | 5/1973 | Ogden, Sr. et al. | 219/137.63 |
| 3,798,410 | 3/1974 | Dinse | 219/137.52 |
| 4,128,754 | 12/1978 | Rathjen, Jr. | 219/137 R |
| 4,282,419 | 8/1981 | Auer | 219/137.44 |

FOREIGN PATENT DOCUMENTS

| | | |
|---|---|---|
| 2510907 | 9/1976 | Fed. Rep. of Germany ........................ 219/137.61 |
| 821093 | 4/1981 | U.S.S.R. . |

Primary Examiner—C. L. Albritton
Assistant Examiner—Alfred S. Keve
Attorney, Agent, or Firm—Kerkam, Stowell, Kondracki & Clarke

[57] ABSTRACT

A long wearing contact tip for an inert gas arc welder comprises an elongated cylindrical copper member having a longitudinal bore therethrough. A portion of the bore is enlarged for receiving a steel liner formed of either spiral wound steel wire or steel tubing. Circumferential grooves are cut into the external surface of the contact tip to afford better cooling of the tip by the inert gas flowing past the tip.

15 Claims, 4 Drawing Figures

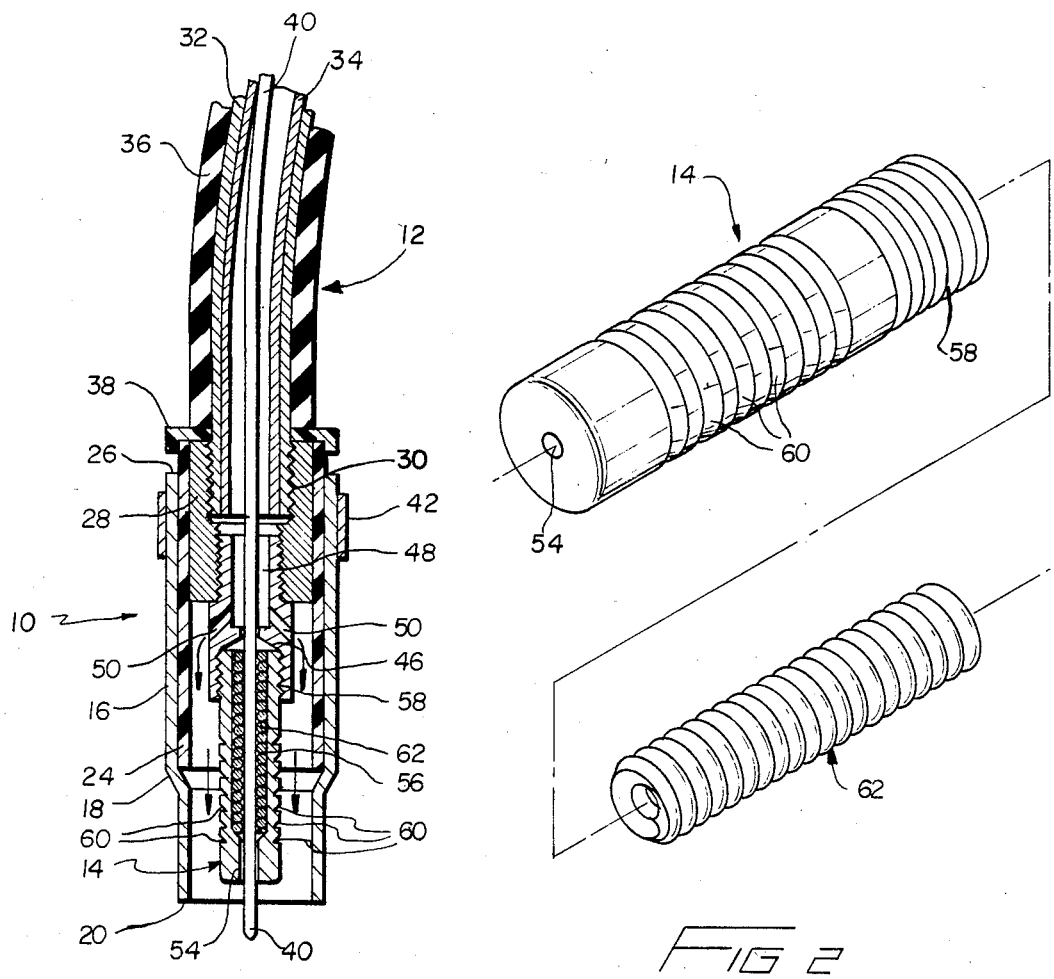
FIG 1
FIG 2
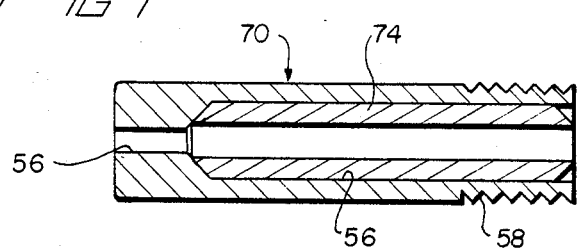
FIG 3
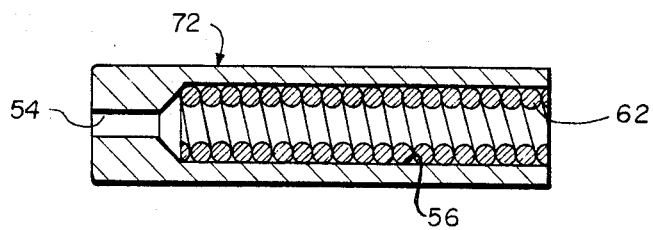
FIG 4

LONG WEARING CONTACT TIP FOR INERT GAS ARC WELDING

BACKGROUND OF THE INVENTION

This invention relates generally to arc welding, and more particuarly to a new and improved contact tip for use in an arc welding gun for guiding and supplying current to a consumable wire electrode.

In a conventional metal inert gas (MIG) arc welding process, a continuous length of welding filler wire is fed from a spool or a roll to an arc welding gun, where it passes through a contact tip which guides the wire to a welding zone and supplies the current necessary to maintain an arc between the wire extending from the tip and a workpiece. The wire, which is continuously fed through the contact tip during welding, constitutes a consumable electrode which is fused down in the electric arc. The welding gun also supplies inert gas to the welding zone which envelopes the arc in an inert gaseous atmosphere.

Conventional contact tips typically comprise a short length of guide tube formed of a good electrical conductor, such as copper, disposed coaxially within a cylindrical gas cup or nozzle in the head assembly of the welding gun. The tip may be tapered toward its outlet end, and may be connected to the head assembly by screw threads or by frictional engagement with a tip receiving device within the head assembly. The inner diameter of the guide tube, i.e., tip bore, is sized to afford sliding contact with the welding wire passing therethrough to enable electrical current to be supplied to the welding wire.

Contact tips operate under very severe conditions and wear out very rapidly. Typically they have a life of only several hours of use. Being close to the electrical arc, they are subjected to very high temperatures which may cause warping of the tip or fusion of the tip and the welding wire. Oxidation and the condensation of metal vapors causes fouling of the tip and a build-up of scale. Moreover, the rate at which welding wire is fed through typical arc welders may be of the order of 1000 feet per minute. Abrasion between the tip, which is typically copper, and the welding wire, which is typically steel, tends to cause enlargement of the tip bore and impairment of the electrical contact between the tip and the welding wire. The build-up of oxidized metal particles and scaling within the tip bore can also produce resistance heating of the tip which can further promote fusion and blockage of the tip bore, and render it unusable. As a result, contact tips in arc welders must be replaced quite frequently, which is both expensive and time consuming.

It is desirable to provide contact tips for arc welders which avoid such problems, and it is to this end that the present invention is directed.

SUMMARY OF THE INVENTION

The invention provides contact tips for arc welders which are exceptionally long-wearing and have a significantly greater life than conventional contact tips, lasting 10 times or more longer than conventional tips. Contact tips in accordance with the invention run cooler than conventional tips. They do not foul or block up as frequently and, when they do, they may be cleaned and reused. Accordingly, they afford a substantial savings in both material and labor costs over conventional tips.

Briefly, in accordance with one aspect, contact tips in accordance with the invention comprise an elongated electrically conductive member having a longitudinally extending bore therethrough through which a consumable wire electrode passes. The portion of the bore between the end of the member which connects to the welding gun and an intermediate portion of the member has a larger cross-sectional dimension than the remaining portion of the bore. The enlarged bore portion defines a longitudinally extending chamber within the member in which is disposed an elongated liner formed of a metal, e.g., steel, which has a hardness at least equal to that of the welding wire. Preferred forms of the liner comprise a tubular member formed of spiral wound wire or solid wall tubing.

Because of the hard liner, enlargement of the bore due to abrasion and material build-up within the bore are substantially reduced. Any material build-up which does occur does not adhere well to the liner, and may be readily removed by running a tip cleaning tool through the bore. Furthermore, the spiral wound liner is particularly advantageous in affording a helical groove which allows a substantial material build-up within the bore without blockage.

Contact tips in accordance with the invention run substantially cooler than conventional tips, which minimizes warping of the tip and fusion of the welding wire to the tip. This is due in part to forming the tip to have a somewhat greater outer diameter than conventional tips, and by maintaining the diameter of the tip substantially constant throughout its length, rather then tapering the tip toward its end from which the welding wire exits as is done with many conventional tips. This provides a greater bulk of material at the end of the tip, which increases its strength and affords better heat conduction. In addition, the external surface of the tip is preferably grooved circumferentially to afford a plurality of cooling fins and a greater surface area to interact with the inert gas flowing past the tip to provide better cooling. The liner is also believed to reduce the internal temperature of the tip, which minimizes the possibility of fusion between the tip and the welding wire. Any fusion which does occur typically occurs at the outward end of the tip and can be cleared by simply grinding away a small portion of the tip at its end so that the tip can be reused.

BRIEF DESCRIPTION OF THE DRAWINGS

FIG. 1 is a cross-sectional view of a portion of one type of a conventional welding gun employing a first embodiment of a contact tip in accordance with the invention;

FIG. 2 is an exploded perspective view of the contact tip of FIG. 1;

FIG. 3 is a cross-sectional view of a second embodiment of a contact tip in accordance with the invention; and FIG. 4 is a cross-sectional view of a third embodiment of a contact tip in accordance with the invention.

DESCRIPTION OF THE PREFERRED EMBODIMENTS

There are many different types of MIG arc welding guns with which the invention may be employed. FIG. 1 illustrates a portion of one such type of arc welding gun employing a contact tip in accordance with the invention which is adapted for use with that particular gun. As will become apparent, however, this is illustrative of only one form of contact tip in accordance with the invention and they may be readily adapted to other types of guns.

FIG. 1 illustrates the head assembly 10 and a portion of the neck assembly 12 of an arc welding gun employing a first embodiment of a contact tip 14 in accordance with the invention. As shown, the head assembly may comprise a substantially cylindrical outer sleeve 16, as of metal, having a stepped diameter portion 18 adjacent to an outlet end 20 of the sleeve. The outer sleeve is disposed about an inner insulating sleeve 24 which extends upwardly (in the Figure) from the stepped diameter portion 18 to a point beyond the upper end 26 of the outer sleeve. An annular head member 28, formed of a good electrical conductor such as copper, extends downwardly from the top of insulating sleeve 24 to an intermediate portion of the head assembly, and is provided with internal threads 30 to enable the head assembly to be threaded onto the end of an electrically conductive tubular conductor 32 in the neck assembly 12. Tubular conductor 32 is connected to a current source (not illustrated) and supplies welding current to head member 28. Tubular conductor 32 may have a wear resistant inner tubular liner 34, as of steel, for example, and its outer surface may be covered by an insulator 36. An annular cup-shaped insulating bushing 38 may be disposed about tubular conductor 32 between insulator 36 and the top of the head assembly. Tubular liner 34 serves as a conduit for guiding welding wire 40 fed from a supply roll or spool (not illustrated) to the head assembly, and further serves to convey inert gas to the head assembly. Outer sleeve 16 and insulating sleeve 24 may be held together by a clamp assembly 42.

Threaded into the lower end of head member 28 is an adaptor 46, which serves as a gas diffuser and which enables connection of contact tip 14 to the head assembly. Adaptor 46, which is formed of an electrically conductive material, such as copper, has an internal chamber 48 which communicates with the outlet end of tubular liner 34 for receiving inert gas supplied to the head assembly. Chamber 48 also communicates with the interior of insulating sleeve 24 via a plurality of downwardly inclined gas ports 50 which provide a downward gas flow (as indicated by the arrows in the figure) past contact tip 14. The gas flow exits outlet end 20 of the outer sleeve, which serves as a nozzle, and provides an annular inert gas curtain about an arc established between the welding wire 40 exiting the contact tip and a workpiece (not illustrated).

As shown in FIGS. 1 and 2, contact tip 14 may comprise an elongated substantially cylindrical member having a longitudinally extending bore 54 through which welding wire 40 passes, and may be formed with external threads 58 at its upper end to enable threaded connection of the tip with adapter 46. Bore 54 of the tip is formed to enable sliding electrical contact with the welding wire to enable welding current supplied to the head assembly by tubular conductor 32 to be supplied to the welding wire. Contact tip 14 is preferably formed from a length of solid copper stock, and, in the form illustrated in FIGS. 1 and 2, may have a plurality of circumferential grooves cut in its periphery to form a plurality of heat-radiating fins 60 which interact with the inert gas flowing past the tip to afford better cooling of the tip.

As shown in FIG. 1, a portion 56 of the longitudinal bore of the contact tip between its upper end (adjacent to adapter 46) and an intermediate location near the lower outlet end of the tip is provided with a larger cross-sectional dimension than the portion 54 of the bore adjacent the outlet end (see also FIGS. 3 and 4 for a similar bore construction of other tips in accordance with the invention). Enlarged portion 56 forms an elongated chamber within the tip, and an elongated spiral wound wire liner 62 is disposed within the enlarged portion 56 of the bore, as shown. (FIG. 4 illustrates another form of a contact tip in accordance with the invention employing a similiar spiral liner 62.) Spiral liner 62 is preferably formed of an abrasion-resistant material, e.g., steel, having a hardness at least equal to or greater than the hardness of the welding wire passing through the tip. Spiral liner 62 may be formed from cold rolled steel wire wound into a tight spiral, as shown, and may comprise, for example, a length of conventional flexible steel wire conduit. The liner minimizes enlargement of the contact tip bore due to abrasion between the tip and the welding wire. This reduces material build-up within the tip bore caused by the accumulation of metal particles or shavings, and, being formed of steel, it maintains reasonably good electrical contact between the tip and the welding wire. In addition, the spaces provided by the internal helical groove of the spiral liner accomodate whatever material build-up may occur, and enable a substantial build-up without blockage of the tip bore.

The liner is also believed to reduce the internal temperature of the contact tip, thereby minimizing oxidation of metal particles and fusion between the tip and the welding wire. Any fusion which does occur has been typically found to be limited to the end of the bore adjacent to its outlet, and the tip may be readily restored by removing it from the head assembly, grinding the fused end down, and cleaning the tip bore with a tip cleaning tool. In addition, it has been found that any material build-up within the tip bore does not adhere well to the liner, and may be readily removed by reaming of the tip bore with the tip cleaning tool.

FIGS. 3 and 4 illustrate, respectively, modified forms of contact tips 70 and 72 in accordance with the invention. As shown in FIG. 3, contact tip 70 is generally similar to contact tip 14, except that instead of a spiral wound wire liner, it employs a solid wall tubular liner 74, which may comprise a length of steel tube, for example, sized to fit within the enlarged portion 56 of the tip bore. Tip 72 of FIG. 4 is also similar to tip 14, except that it is formed for use with another type of arc welding gun that relies upon frictional engagement between the contact tip and the head assembly for attaching the contact tip thereto. Accordingly, the end of contact tip 72 is not threaded, as shown at 58 for contact tips 14 and 70.

Tips in accordance with the invention may employ either a spiral wound liner 62, as shown for tips 14 and 72 or may employ a solid wall tubular liner 74, as shown for tip 70. The spiral wound liner is preferred, however, in that it enables a greater build up of material within the tip bore without blockage. Contact tips 70 and 72 also differ from tip 14 in that their external surface is not grooved to form cooling fins 60, as is tip 14. The cooling tips are not essential to the invention, although they are desirable since they promote better cooling of the tip.

As previously indicated, tips in accordance with the invention may be formed from solid copper cylindrical stock which is bored out to provide the longitudinally extending stepped diameter bore. Tips for typical arc welding guns may have a diameter of the order of ⅜ inch and a length of the order of 1.5 inches, and the length of the enlarged bore portion 56 may be approximately 1.25 inches. The following Table gives representative dimensions for the diameter of the narrow portion 54 of the tip bore and for the outer diameter (O.D.) and inner diameter (I.D.) of the liner, for different welding wire sizes. The inner diameter of the enlarged bore portion 56 of the tip is formed to be slightly larger than the outer diameter of its corresponding liner so as to enable the liner to be received within the enlarged bore portion. All dimensions in the Table are in inches.

TABLE

| (DIMENSIONS IN INCHES) | | | |
|---|---|---|---|
| WELDING WIRE SIZE | TIP BORE I.D. | LINER O.D. | LINER I.D. |
| 0.030 | 0.047 | 0.186 | 0.075 |
| 0.045 | 0.078 | 0.196 | 0.095 |
| 0.0625 | 0.089 | 0.268 | 0.120 |

As may be noted from the Table, the inner diameter of the liner, i.e., its bore, may be somewhat greater than the inner diameter of the narrow portion 54 of the tip bore. Also, the inner diameter of the tip bore may be of the order of 1.4 to 1.7 times the diameter of the welding wire, whereas the inner diameter of the liner may be of the order of 2 or more times greater than the wire diameter. These bore sizes are sufficiently small to enable good electrical contact with the welding wire, and the larger inner diameter of the liner enables a substantial buildup of material without blockage of the bore.

Contact tips in accordance with the invention have better resistance to warping than conventional tips, thereby enabling sustained use with higher welding currents, and have been found to be less susceptible to fouling and burning than conventional tips. As a result, tips in accordance with the invention have been found to have a substantially longer life, e.g., 10 times or more greater than conventional tips.

While preferred embodiments of the invention have been shown and described, it will be appreciated by those skilled in the art that changes may be made in these embodiments without departing from the principles and spirit of the invention, the scope of which is defined in the appended claims.

I claim:

1. A contact tip for use in an inert gas arc welding gun comprising an elongated electrically conductive member having a longitudinally extending bore therethrough, the member having an inlet end adapted for connection to a welding gun and for receiving within the bore a consumable wire electrode fed through the welding gun, and having an outlet end, a first portion of the bore extending from the inlet end to an intermediate location of the member being formed to have a larger cross sectional dimension than a second portion of the bore extending from the intermediate location to the outlet end, and an elongated spiral wound wire liner disposed within the first portion, the liner being formed of a material having a hardness that is equal to or greater than the hardness of the wire electrode.

2. The contact tip of claim 1, wherein said liner is formed of steel.

3. The contact tip of claim 1, wherein said elongated member is substantially cylindrical and has a substantially constant diameter between its inlet end and its outlet end.

4. The contact tip of claim 3, wherein the elongated member has a plurality of cooling fins on the periphery of its external surface.

5. The contact tip of claim 1, wherein the liner has a length substantially equal to the length of the first portion of the bore, and has an inner diameter which is greater than the diameter of the second portion of the bore.

6. The contact tip of claim 1, wherein the inlet end of the elongated member is threaded.

7. The contact tip of claim 1, wherein the liner extends from the inlet end to the intermediate location and has a length greater than approximately three-fourths the length of the elongated member.

8. A contact tip for use in an inert gas arc welding gun comprising an elongated electrically conductive member having a longitudinally extending bore therethrough, the member having an inlet end adapted for connection to a welding gun and for receiving within the bore a consumable wire electrode fed through the welding gun, and having an outlet end, a first portion of the bore extending from the inlet end to an intermediate location of the member being formed to have a larger cross sectional dimension than a second portion of the bore extending from the intermediate location to the outlet end, and an elongated spiral wound wire liner disposed within the first portion of the bore.

9. The contact tip of claim 8, wherein the spiral wound wire liner is formed of steel wire wound in a tight spiral.

10. The contact tip of claim 9, wherein the spiral liner has a length substantially equal to the first portion of the bore, and has an inner diameter that is greater than the diameter of the second partion of the bore.

11. The contact tip of claim 10, wherein said diameters are sized to afford sliding electrical contact with the wire electrode passing through the tip and to afford a substantial material buildup within the second portion of the bore and within the liner without blockage.

12. The contact tip of claim 8, wherein the elongated member is substantially cylindrical and has a plurality of cooling fins disposed upon its external surface.

13. The contact tip of claim 12, wherein said cooling fins comprise a plurality of circumferentially extending grooves in the external surface.

14. The contact tip of claim 8, wherein the elongated member is formed from solid copper cylindrical stock.

15. The contact tip of claim 8, wherein the liner extends from the inlet end to the intermediate location and has a length greater than approximately three-fourths the length of the elongated member.

* * * * *